(12) United States Patent
Fletcher

(10) Patent No.: US 12,468,559 B2
(45) Date of Patent: Nov. 11, 2025

(54) SYSTEM AND METHOD FOR GENERATING CUSTOMIZED USER INTERFACE WITH MULTI-APPLICATION FUNCTIONALITY

(71) Applicant: Grass Valley Canada, Montreal (CA)

(72) Inventor: Ian Fletcher, Castle Donington (GB)

(73) Assignee: GRASS VALLEY CANADA, Montreal (CA)

( * ) Notice: Subject to any disclaimer, the term of this patent is extended or adjusted under 35 U.S.C. 154(b) by 315 days.

(21) Appl. No.: 18/351,285

(22) Filed: Jul. 12, 2023

(65) Prior Publication Data

US 2024/0020135 A1    Jan. 18, 2024

Related U.S. Application Data

(60) Provisional application No. 63/388,795, filed on Jul. 13, 2022.

(51) Int. Cl.
*G06F 3/0482* (2013.01)
*G06F 3/04845* (2022.01)
*G06F 3/04847* (2022.01)
*G06F 3/0486* (2013.01)
*G06F 9/451* (2018.01)

(52) U.S. Cl.
CPC ............ *G06F 9/451* (2018.02); *G06F 3/0482* (2013.01); *G06F 3/04845* (2013.01); *G06F 3/04847* (2013.01); *G06F 3/0486* (2013.01)

(58) Field of Classification Search
CPC .... G06F 9/451; G06F 3/0482; G06F 3/04845; G06F 3/04847; G06F 3/0486; G06F 8/41; G06F 8/34; G06F 8/38
See application file for complete search history.

(56) References Cited

U.S. PATENT DOCUMENTS

| | | | |
|---|---|---|---|
| 10,031,725 B2* | 7/2018 | Ben-Tzur | G06F 8/20 |
| 2006/0235548 A1 | 10/2006 | Gaudette | |
| 2007/0061486 A1 | 3/2007 | Trinh et al. | |
| 2011/0107244 A1* | 5/2011 | Kinoshita | G06F 9/451 715/763 |
| 2012/0041990 A1 | 2/2012 | Kreindlina et al. | |
| 2015/0019991 A1 | 1/2015 | Kristjansson | |
| 2016/0170742 A1* | 6/2016 | Pallath | G06F 8/34 717/120 |
| 2016/0321064 A1* | 11/2016 | Sankaranarasimhan | H04L 67/34 |
| 2017/0134381 A1 | 5/2017 | Abdelhamed et al. | |

(Continued)

OTHER PUBLICATIONS

International Search Report and Written Opinion in PCT/CA2023/050931, mailed Sep. 14, 2023, 11 pages.

*Primary Examiner* — Rinna Yi

(74) *Attorney, Agent, or Firm* — ARENTFOX SCHIFF LLP

(57) ABSTRACT

A control surface designer (CSD) module may generate a configuration user interface that lists a plurality of applications and their respective plurality of commands, wherein the configuration user interface includes, for each command of the respective plurality of commands, parameters of specific command instances. The CSD module may receive, via the configuration user interface, selections of commands from different applications in the plurality of applications, and may generate code payloads that correspond to the commands. The CSD module may generate a customized user interface that includes the commands by compiling the code payloads.

16 Claims, 6 Drawing Sheets

(56) References Cited

U.S. PATENT DOCUMENTS

| | | |
|---|---|---|
| 2021/0192106 A1 | 6/2021 | Bourhani et al. |
| 2021/0334453 A1 | 10/2021 | Padula et al. |
| 2023/0135634 A1* | 5/2023 | Singh ................ G06F 9/44526 717/106 |

* cited by examiner

200

| APPLICATIONS 202 | COMMANDS 204 | CONFIGURATIONS PANEL 206 |
|---|---|---|
| Alchemist | Clip(1.2) | Transportstate(1.1) — *Selected command 208* |
| AudioMixer | Transportstate(1.1) | |
| ChangeOver | Clip(1.3) | Description 210 |
| CleanCut | Playpause(1.0) | |
| ClipPlayer | Startat(1.0) | Transportstate<br>Command used to set the transportstate and/or update the end behavior |
| Clock | Stopat(1.0) | Parameters<br>State(enum) [ 'play', 'pause' ]<br>EndBehavior (enum) ['loop','repeat']<br>StartAt(string) Optional StartAt time in UTC timeformat |
| Crawl | Gotostart(1.0) | |
| Delay | Gotoend(1.0) | Example PayLoad<br>{<br>"State"; "pause",<br>"EndBehavior"; "loop"<br>} |
| ElasticRecorder | Stepforward(1.0) | |
| FileMonitor | Stepback(1.0) | |
| FlowMonitor | Markin(1.0) | |
| GlobalInput | | Schema 212 |
| HighBitrateReceiver | | Transport state |
| HTML | | State: *Select a value* ⟩⟩    PayLoad<br>EndBehavior: *Select a value* ⟩⟩    {<br>Start At: Snow    "State"; "play",<br>Target: *Workload* ⟩⟩    "EndBehavior"; "loop"<br>Workload: *Select a value* ⟩⟩    }<br>[ Commit ] |
| Input | | |
| IPS | | |
| Keyer | | |
| LiveProducer | | |
| LogoInserter | | |

FIG. 2

SYSTEM AND METHOD FOR GENERATING CUSTOMIZED USER INTERFACE WITH MULTI-APPLICATION FUNCTIONALITY

CROSS-REFERENCE TO RELATED APPLICATIONS

The application claims the benefit of U.S. Provisional Application No. 63/388,795, filed Jul. 13, 2022, which is herein incorporated by reference.

TECHNICAL FIELD

The present disclosure generally relates to user interfaces (UIs), and, more particularly, to a system and method for generating a customized UI with multi-application functionality as part of a media production environment.

BACKGROUND

The equipment used by the broadcasting industry has developed considerably over the years and a plethora of functions and features are available in both software and hardware. Despite the abundance of resources, for any given show or production, only a small percentage of features and functions are commonly utilized. Consider a production switch with a large amount of buttons, each serving a different purpose. Due to commercial pressure to make productions as cheap as possible, an average technician may only access a few of those buttons—all other buttons are rarely used.

While production switches are limited to a particular size, user interfaces (UIs) of applications used in the production industry can be infinitely more complex due to the inclusion of multiple windows, drop down menus, buttons, and the like. Although the simultaneous access to all functionality theoretically places resources within hand's reach, a clunky and complex UI has the opposite effect. The experience becomes more cumbersome if the user needs access to different applications simultaneously and has multiple windows open.

There thus exists a need for a UI that is tailored towards the needs of a particular user.

SUMMARY

The Agile Media Processing Platform (AMPP) is an example of a cloud-based platform that offers a comprehensive suite of applications. Some of these applications include AMPP Mini Mixer, AMPP Live Producer, AMPP Clip Player, and AMPP Recorder. A user can potentially access each of these applications and navigate the user interfaces (UIs) in their default state. As discussed previously, however, a user may simply be interested in utilizing a subset of features from each application. To streamline UI navigation, the present disclosure describes enabling the user to generate a customized UI that includes user-selected functionality from multiple applications. This results in a UI that is focused around what the user needs (or desires) to do for a particular production, and the complexity of the applications that are running in the background is hidden away from the user. Rather than requiring access to the source code of each application and programming knowledge, the present disclosure describes a control surface designer that allows users to generate customized UIs using high-level commands and interactions.

In some aspects, the techniques described herein relate to a system for generating a customized user interface with multi-application functionality, the system including: a control surface designer module configured to: receive, from a cloud-based media platform, a plurality of applications and a respective plurality of commands for each application of the plurality of applications; generate a configuration user interface that lists the plurality of applications and the respective plurality of commands, wherein the configuration user interface includes, for each command of the respective plurality of commands, parameters of specific command instances; receive, via the configuration user interface, a selection of a command from an application in the plurality of applications, wherein the selection includes a set of parameters from the command; generate a code payload that corresponds to the command with the set of parameters; receive, via the configuration user interface, another selection of a different command from a different application in the plurality of applications, wherein the another selection includes another set of parameters from the different command; generate another code payload that corresponds to the different command with the another set of parameters; generate a customized user interface that includes both the command and the different command by compiling the code payload and the another code payload.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

FIG. 2 is a diagram of a control surface designer for setting parameters of functionality to be added to a customized user interface according to an example embodiment.

DETAILED DESCRIPTION

Figure 1:
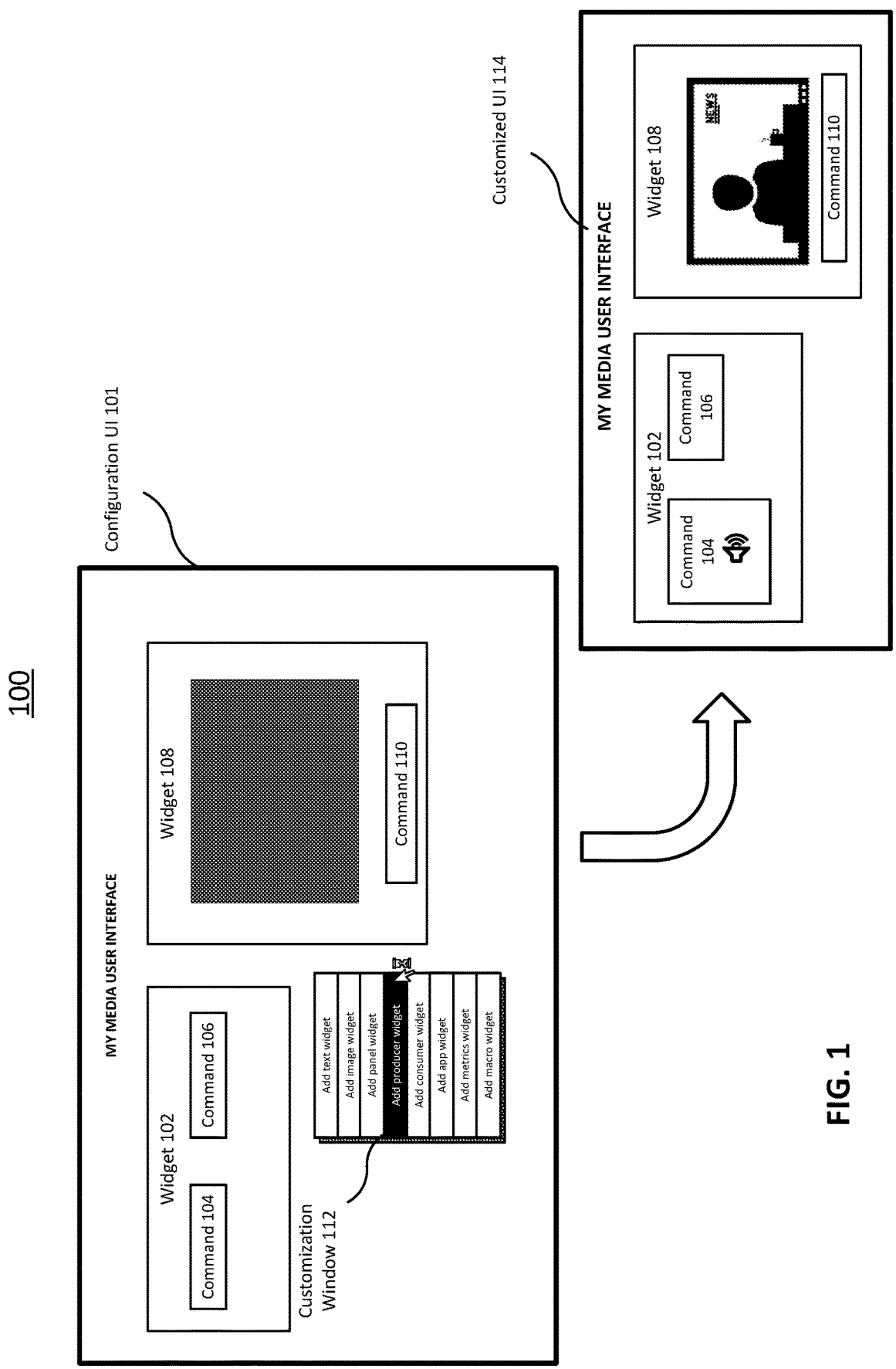
FIG. 1 is a diagram of a customized user interface with multi-application functionality being generated with a control surface designer according to an example embodiment.

Various aspects of the disclosure are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the disclosure in order to provide a basic understanding thereof.

The present disclosure describes a control surface designer, which may be a software-based tool that generates customized UIs with multi-application functionality. The control surface designer builds the framework to support applications as desired for a control surface. The framework is populated with devices describing themselves in compliance with the known syntax and lexicon for integration into a platform with an ecosystem of applications (e.g., AMPP). In addition, the framework of the control surface designer is used to guide the construction and representation of the platform capabilities as needed.

In some aspects, the control surface designer acts as a compiler and generates the necessary details for a workflow (first, as a framework for the details, and second, with the particular details based on the selected applications). As applications are selected, the details of their command/control can be used to feed the compiler.

In another exemplary aspect, the control surface designer is configured to enable graphical UI building. For example, a user may execute, via the configuration user interface, a drag and drop function to drag and drop widgets from customization window 112 to a preview interface that depicts a layout of the customized user interface (e.g., drag and drop widget 102 onto configuration UI 101, which corresponds to a placement location on customized UI 114).

The user may also execute, via the configuration user interface, a resizing function by dragging a portion (e.g., a corner of a widget) of a widget from one location to another. The resizing function proportionally sizes the widget based on the distance between the one location and the another location.

The control surface designer may enable a user to set parameters using high-level commands (i.e., without needing to code or access pre-existing code). Ultimately, the control surface designer pulls features and functions from completely separate abstract instances of different applications into a common user interface without requiring the user to do programming.

FIG. 1 is diagram 100 of a customized user interface with multi-application functionality being generated with a control surface designer according to an example embodiment. In diagram 100, a user may utilize configuration UI 101 of the control surface designer to add functions and features and generate a customized UI 114. For example, a user may right-click on configuration UI 101 in an unoccupied space, and in response, control surface designer may generate customization window 112. Customization window 112 includes a plurality of options to add widgets (e.g., add text widget, add image widget, etc.). A widget represents a portion of customized UI 114 that provides access to commands from one or more applications. For example, widget 102 may be a window that provides access to command 104 and command 106. Through customization window 112, a user may add widget 108 to customized UI 114, where widget 108 provides access to command 110. Adjusting the functionality of each command is described in reference to diagram 200. The control surface designer may generate code as the user interacts with configuration UI 101 and may subsequently compile the code to generate a standalone application with customized UI 114.

FIG. 2 is diagram 200 of a control surface designer for setting parameters of commands to be added to a customized UI according to an example embodiment. When adding a widget to customized UI 114 using configuration UI 101, control surface designer may provide additional options through a secondary window shown in diagram 200. The window may include a list of applications 202 (e.g., Alchemist, AudioMixer, ClipPlayer, etc.) available through the platform (e.g., AMPP). It should be noted that each of these applications may have their own individual user interfaces. Accordingly, if a user intends to use a variety of functionality to generate a media production, for example, the user may need to navigate through several user interfaces. This makes the user experience of accessing the applications cumbersome.

When accessing the control surface designer, a user may select one of the applications (e.g., ClipPlayer) on configuration UI 101, which generates a list of commands 204 (e.g., clip(1.2), transportstate(1.1) etc.) available in the selected application. Subsequently the user may select a command to associate with the widget. For example, the user may select the command transportstate(1.1) to include in widget 102 as command 104. In some aspects, a user may configure the size (e.g., dimensions) and visual appearance (e.g., color, buttons, dropdowns, etc.) of each widget using configuration UI 101. The user may further assign a number of commands to each widget and control the amount of widgets in each customized UI.

In some aspects, the control surface designer may enable the user to set the parameters of the command to achieve a particular instance of the command (e.g., a user may select a portion of all parameters available for a command). For example, if a default version of a command adjusts the volume of a stream from 0% to 100%, the user may adjust the minimum and maximum volume parameters such that the version of the command included in customized UI 114 adjusts the volume from 50% to 80%. In some aspects, the user may adjust the parameters such that the version of the command included in customized UI 114 solely toggles the volume from 0% to 100%.

On a technical level, this is achieved by configurations panel 206. Configurations panel 206 includes description 210 of selected command 208 and enables the user to adjust schema 212. For example, selected command 208 may be transportstate, which is a command used to set the transportstate and/or update the end behavior. Description 210 includes a purpose of the command, parameters, and an example payload. Schema 212 includes each parameter (e.g., "State," "EndBehavior," "StartAt,") and enables a user to configure the parameter. For example, for "State," a user may access the adjacent dropdown menu in schema 212 to select between "play" and "pause." For "EndBehavior," a user may access the adjacent dropdown menu in schema 212 to select between "loop" and "repeat." For "StartAt," a user may access toe adjacent text input field to type in a value such as "Snow." As the user makes selections, a code payload is generated by control surface designer. For example, the user may select "play" and "loop" as parameters for selected command 208. Control surface designer may generate a payload that states:

```
PayLoad
{
    "State"; "play",
    "EndBehavior"; "loop"
}
```

In some aspects, a user may further indicate a workload that executes selected command 208. The workload may be a particular node or a group of nodes that are assigned the execution. For example, a user may assign any node(s) from Amazon Web Services or Google Cloud Platform as the workload by accessing the adjacent dropdown menu in schema 212. In response to receiving a "commit" command from the user, the control surface designer may compile the code payload and generate customized UI 114. In some aspects, the control surface designer may further transmit the code payload to the particular workload (e.g., Amazon Web Services) selected by the user. For example, when a user selects command 106 on customized UI 114, the transport-state command configured based on the selected parameters may be executed by a node on Amazon Web Services.

As shown in diagram 100, customized UI 114 includes several commands. For example, widget 108 may be associated with a different command from commands 204. The different command may have a different selection of parameters (set using configurations panel 206). When the code payload of the different command is compiled, widget 108 may depict a stream of a newscast. A user may be able to mute and unmute the stream using command 104. A user may be able to increase the speed at which the stream is played using command 110. A user may be able to execute the transportstate command using command 106.

In some aspects, customized UI 114 may include functions from different applications. For example, command 106 may be associated with the application ClipPlayer from applications 202, whereas command 104 may be associated with application AudioMixer from applications 202. Furthermore, each command in customized UI 114 may be executed by a different workload depending on the configurations set by a user. For example, command 104 may be executed by a first node in a first network (e.g., Amazon Web Services) and command 106 may be executed by a second node in a second network (e.g., Google Cloud Platform). In some aspects, a user may include, in customized UI 114, two or more of the same command (e.g., transportstate), each with different workload selections. This may achieve a level of redundancy that ensures that the command is executed regardless of whether one of the nodes in a particular workload is not working.

The systems and methods described herein enable third parties (e.g., individuals) to quickly develop new applications that run in a particular ecosystem (e.g., AMPP). With the architecture provided, a third party may have a head start with code that has some functionality (rather than starting from scratch). The third party can thus publish a schema that with a custom set of commands taken from various application, build a user interface to access those features and functions, and then ship that together with their piece of software. This results in an application that runs in the ecosystem and is developed with a drastically reduced development time and cost relative to full stack application development from scratch.

For example, the AMPP platform technology exposes capabilities, capacities, and (either explicitly or implicitly) a control mechanism. The control mechanism can be either or both a behavior with rules and a traditional model. A behavior with rules may be "decrease the background audio volume to a certain level whenever the primary program audio comes on: a traditional dunk." A traditional model is a fader with an audio taper and an initial position.

The present disclosure exposes a container defined by its interface points, yet still available for arbitrary contents. This allows a third party application, which could be stand-alone elsewhere, to be more richly integrated into the AMPP ecosystem (i.e., the Grass Valley Media Universe (GVMU)). Yet, to provide more capability for such applications there is a need to recognize the description of the interface points of the container, and map them to the controlling points of lower level AMPP platform services. This requires a common syntax and lexicon, defined to represent what platforms such as AMPP can do at a low level, without disclosing how the actions that the platform can perform.

In other words, the disclosed system and method is configured to expose functional capabilities of the overall media content product platform, without exposing how the capability is achieved. By using a compiler (e.g., rules), which operate on the framework and a unique identity database of the platform, this technique of exposing interoperability points enables equivalence of different media processing components at a functional level. As a result, the system and method also enables additions of core functions in the future, even if they are not currently available or anticipated. As such, the system and method enables the entire ecosystem to evolve by expansion and refinement of the syntax and lexicon used to identify the capabilities and capacity of the connections.

In general, containerization (e.g., Docker, Kubernettes, etc.) in combination with clock as a service (CaaS) and functions f(x) all rely on a registry of unique identities assigned to a describable capability. On top of this, the use of identity for abstraction of time (e.g., time to execute a workflow, walk clock time, or relative time of events, etc.), form, and location of essence utilized the same registry, or segments of it, to properly deploy the workloads, packages, micro-services, etc., such that a workflow data graph is executed to the required design of the customer.

Figure 3:
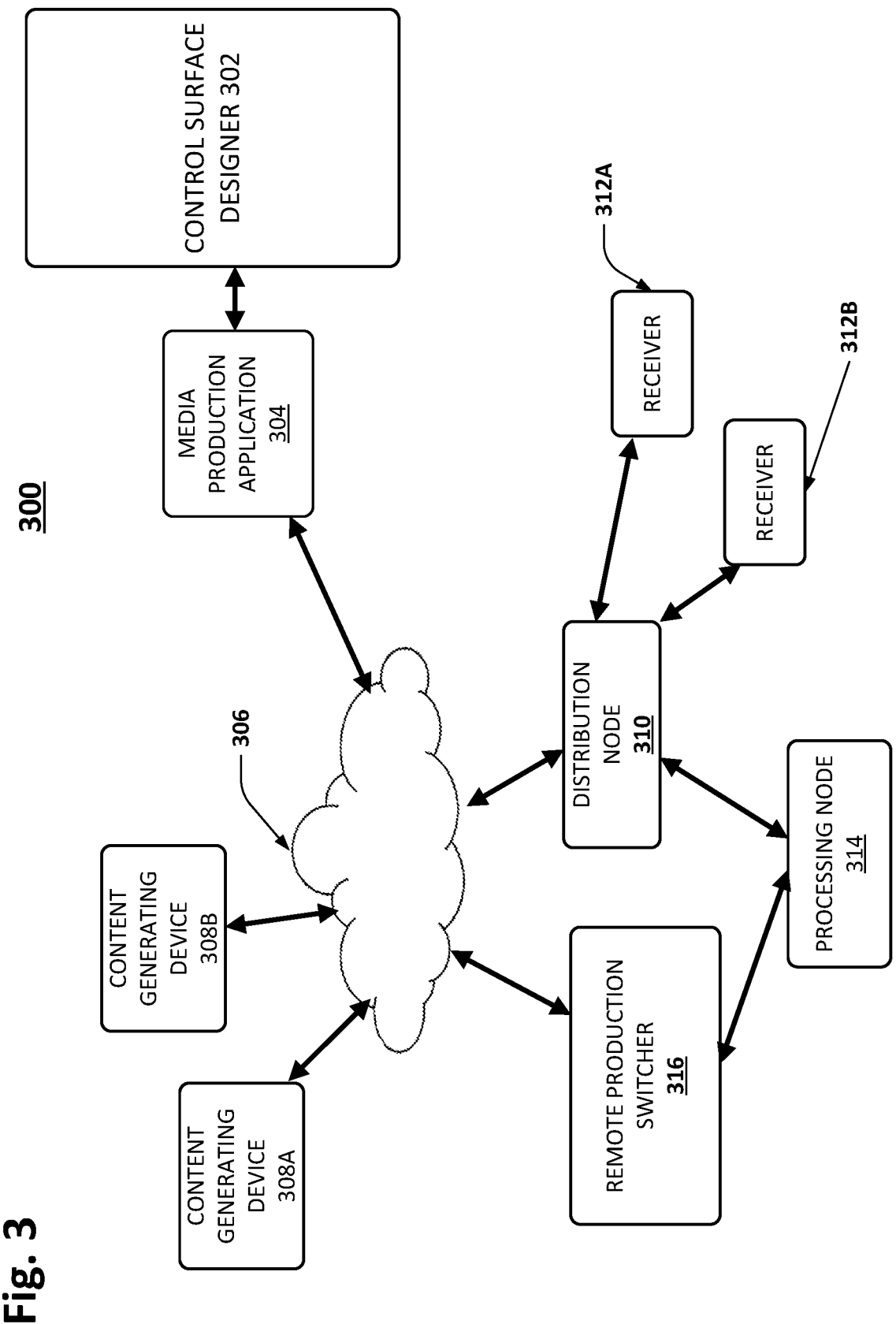
FIG. 3 is a diagram of a system for utilizing a customized UI according to an example embodiment.

FIG. 3 illustrates a block diagram of system 300 for utilizing a customized UI according to an exemplary embodiment. In an exemplary aspect, control surface designer 302 is configured to compile code and generate media production application 304 with a customized UI. As described above, application 304 includes commands from a plurality of applications (e.g., from applications 202) provided in a media platform. The media platform, such as AMPP, may be available on the cloud network 306 across multiple nodes (e.g., processing node 314, distribution node 310, etc.).

Content generating (or providing) devices 308A and 308B represent, for example, cameras that are used to provide streams of live events (e.g., sports events) or video servers configured to provide stored media essence. The content outputted from content generating devices 308A and 308B are adjusted using the functions/commands discussed in the present disclosure. In an alternative embodiment, the content generating devices 308A and 308B may be video or media servers or any other device configured to store and/or provide essence to be used in a media production.

As mentioned previously, each command of application 304 may be executed using a particular node in a cloud network. That is, to provide these capabilities, the functionality of application 304 maps interface points of the particular functions to the controlling points of lower level platform services (i.e., as nodes) distributed across the network. As desired applications or functions are selected on application 304, the details of their command and/or control is used to feed the compiler.

Moreover, the one or more distribution nodes 310 (e.g., electronic devices) are configured to distribute the production media content to one or more distributed nodes (e.g., remote media devices), such as receivers 312A and 312B, which can be content consuming devices (e.g., televisions, computing devices, or the like), for example. Moreover, it should be appreciated that while only two receivers 312A and 312B are shown, the network can include any number of content consuming devices configured to receive and consume (e.g., playout) the media content, with such content consuming devices even being distributed across different countries or even different continents.

Moreover, in this network, distribution node(s) 310 can further be configured to distribute the media content throughout the distribution network to one or more processing node(s) 314, which may include a mix/effects engine, keyer or the like. Examples of processing node(s) 314 may include remote production switches similar to remote production switcher 316 or remote signal processors and can be included in the cloud computing environment in an exemplary aspect. For example, each processing node may perform a particular command of an application in AMPP. In an exemplary aspect, a first processing node can be configured to perform actions for the application "ClipPlayer" in FIG. 2 and a second processing node can be configured to perform a particular command for the application "ElasticRecorder" in FIG. 2, with these functions being distributed to one or more processing nodes 314 or the like, for example. In other words, control surface designer 302 enables media production application 304 to include different commands of applications distributed throughout the cloud network 306. Accordingly, the functionality of media production application 304 is provided by a plurality of processing nodes over cloud network 306. A user of media production application 304 may thus have one command be executed by a first processing node and another command be executed by a second processing node.

Figure 4:
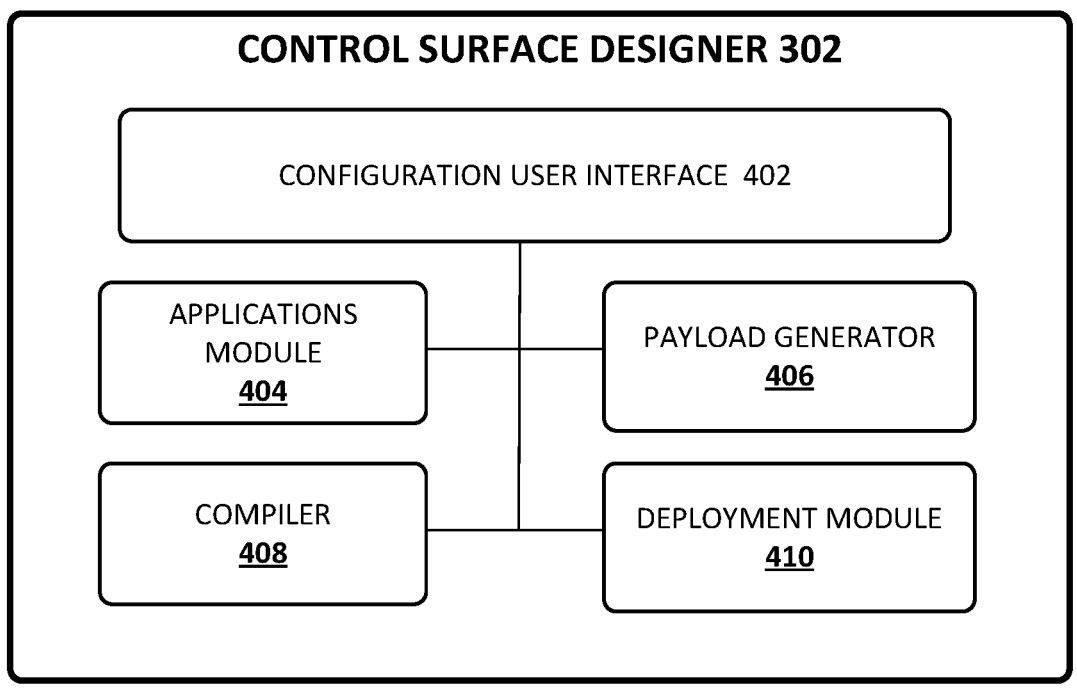
FIG. 4 is a block diagram of components in a control surface designer according to an example embodiment.

FIG. 4 is a block diagram of components in control surface designer 302 according to an example embodiment. Control surface designer 302 includes configuration UI 402, which a user interacts with to create a customized UI featuring their selected applications and commands. Control surface designer 302 may include an applications module 404 that receives information about applications in a platform (e.g., new features, patches, payload structures, associated functionality, etc.). Applications module 404 populates the UI shown in FIG. 2 using the received information.

Control surface designer 302 may include payload generator 406, which generates code based on the selections made by the user on configuration UI 402. Control surface designer 302 may further include compiler 408, which compiles the code generated by payload generator 406. Lastly, control surface designer 302 may include deployment module 410, which identifies a workload selected by a user of the configuration UI and sends the payload of a particular function to that node. In more general terms, the configuration UI is configured to effectively and dynamically manage a media production (or portion thereof) starting with the obtaining of essence and processing of one or more functions on the essence to generate a media content production that can then be distributed to a video editor or content consumption device as described above.

Figure 5:
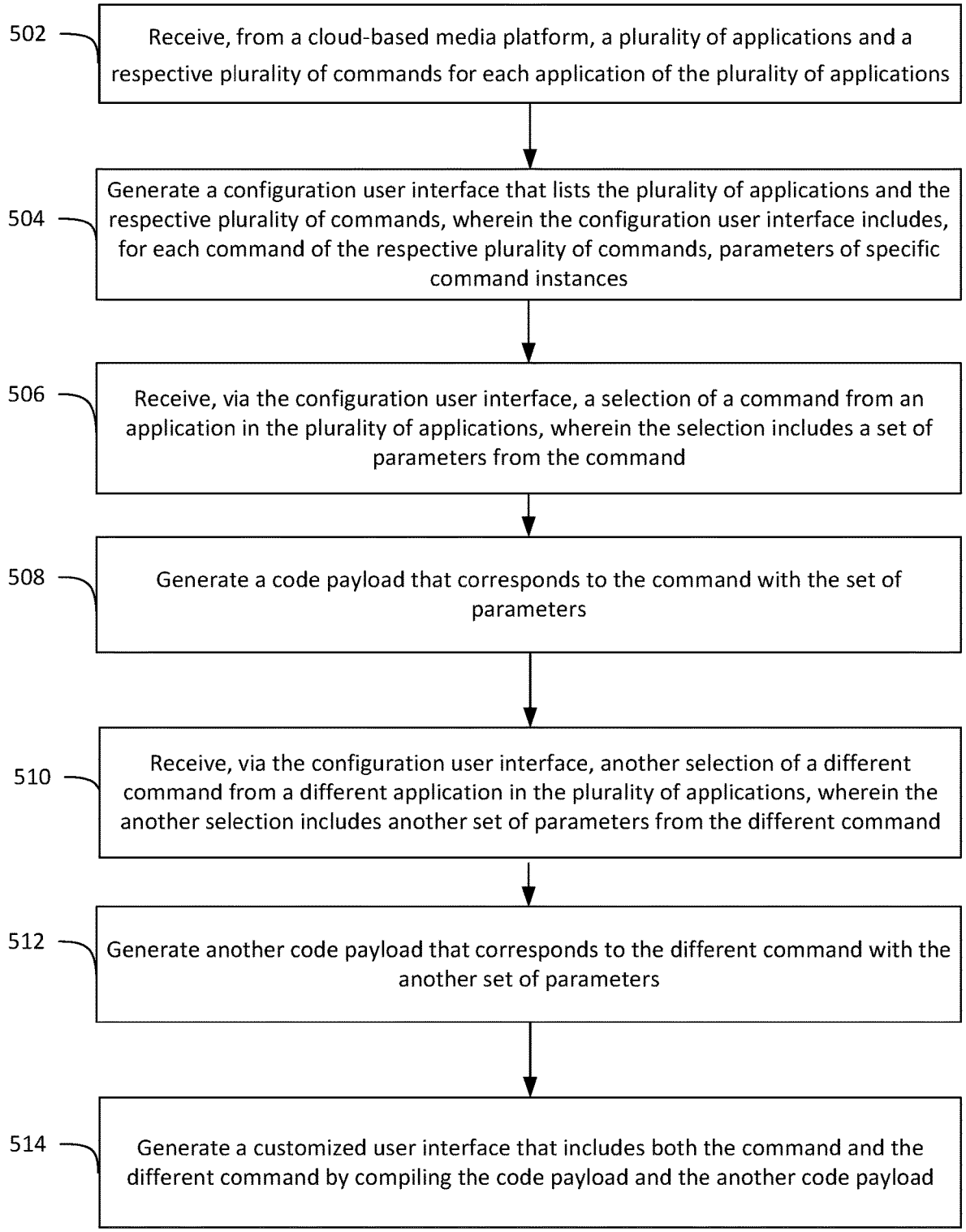
FIG. 5 is a flow diagram of a method for generating a customized UI with multi-application functionality according to an example embodiment.

FIG. 5 is a flow diagram of method 500 for generating a customized UI with multi-application functionality according to an example embodiment.

At 502, applications module 404 receives, from a cloud-based media platform, a plurality of applications and a respective plurality of commands for each application of the plurality of applications. At 504, control surface designer 302 generates configuration user interface 402 that lists the plurality of applications and the respective plurality of commands, wherein the configuration user interface includes, for each command of the respective plurality of commands, parameters of specific command instances.

At 506, control surface designer 302 receives, via configuration user interface 402, a selection of a command from an application in the plurality of applications, wherein the selection includes a set of parameters from the command. At 508, payload generator 406 generates a code payload that corresponds to the command with the set of parameters. At 510, control surface designer 302 receives, via configuration user interface 402, another selection of a different command from a different application in the plurality of applications, wherein the another selection includes another set of parameters from the different command.

At 512, payload generator 406 generates another code payload that corresponds to the different command with the another set of parameters. At 514, control surface designer 302 generates a customized user interface that includes both the command and the different command by compiling, using compiler 408, the code payload and the another code payload.

Figure 6:
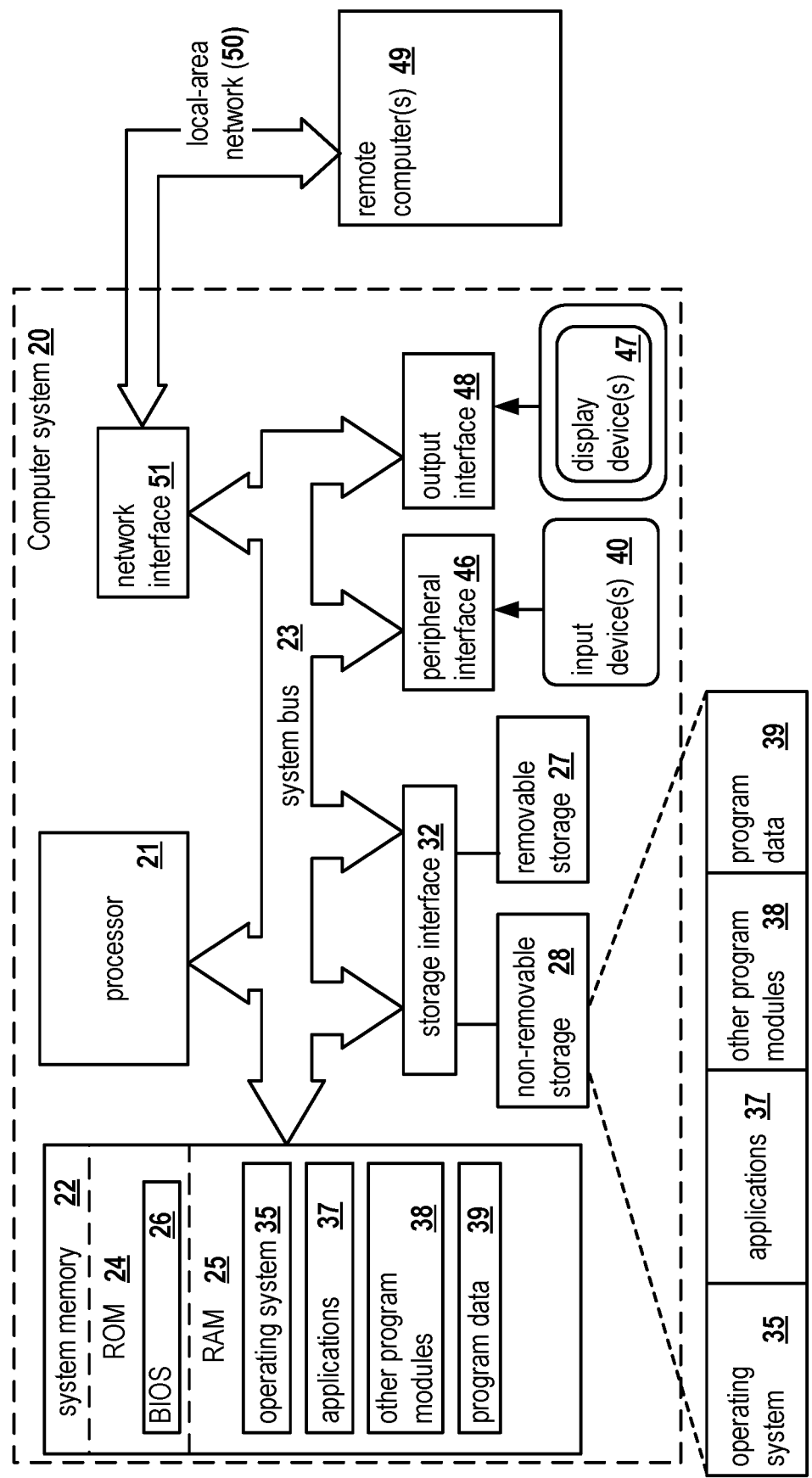
FIG. 6 is a block diagram illustrating a computer system on which aspects of the present systems and methods may be implemented in accordance with an exemplary aspect.

FIG. 6 is a block diagram illustrating a computer system 20 on which exemplary aspects of the system and method for generating a customized UI with multi-application functionality can be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. It is noted that according to one exemplary aspect, the program application 37 can correspond to a web browser of which a filter graph, as described above, can be directly constructed therein. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

As noted above, exemplary aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A system for generating a customized user interface with multi-application functionality, the system comprising:
   at least one processor;
   a control surface designer module configured to, by the at least one processor:
   receive, from a cloud-based media platform, a plurality of applications and a respective plurality of commands for each application of the plurality of applications;
   generate a configuration user interface displayed on a display device that lists the plurality of applications and the respective plurality of commands, wherein the configuration user interface includes, for each command of the respective plurality of commands, parameters of specific command instances;
   receive, via the configuration user interface by a user, a selection of a command from an application in the plurality of applications, wherein the selection includes a set of parameters from the command;
   generate a code payload that corresponds to the command with the set of parameters on the configuration user interface;
   receive, via the configuration user interface by the user, another selection of a different command from a different application in the plurality of applications, wherein the another selection includes another set of parameters from the different command;
   generate another code payload that corresponds to the different command with the another set of parameters on the configuration user interface; and
   generate a customized user interface that includes both the command and the different command by compiling the code payload and the another code payload,
   wherein the configuration user interface includes a preview interface that depicts a layout of the customized user interface, and is configured to receive, via the configuration user interface by the user, a selection of at least one widget for placement on the preview interface.

2. The system of claim 1, wherein the at least one widget comprises at least one button for the command and the different command.

3. The system of claim 2, wherein the control surface designer module is further configured to:
   receive, via the configuration user interface, a widget size and a placement location on the preview interface for a first widget of the at least one widget; and
   generate the customized user interface to depict the first widget at the widget size in the placement location on the customized user interface.

4. The system of claim 2, wherein the control surface designer module is further configured to receive the selection of the at least one widget by:
   executing a drag and drop function that moves the at least one widget from a customization window to the preview interface.

5. The system of claim 1, wherein the set of parameters from the command is a portion of all parameters associated with the command, and wherein the command is a specific command instance.

6. The system of claim 1, wherein the control surface designer module is further configured to:
   receive, via the configuration user interface, a workload comprising at least one node to execute the command; and
   transmit the code payload to the workload for execution.

7. The system of claim 6, wherein the control surface designer module is further configured to:
   receive, via the configuration user interface, a different workload comprising at least one different node to execute the different command; and
   transmit the another code payload to the different workload for execution.

8. The system of claim 6, wherein the control surface designer module is further configured to:
   receive, via the configuration user interface, a different workload comprising at least one different node to execute the command; and
   transmit the code payload to the workload and the different workload for execution.

9. A method for generating a customized user interface with multi-application functionality, the method comprising:
   receiving, from a cloud-based media platform, a plurality of applications and a respective plurality of commands for each application of the plurality of applications;
   generating a configuration user interface displayed on a display device that lists the plurality of applications and the respective plurality of commands, wherein the configuration user interface includes, for each command of the respective plurality of commands, parameters of specific command instances;
   receiving, via the configuration user interface by a user, a selection of a command from an application in the plurality of applications, wherein the selection includes a set of parameters from the command;
   generating a code payload that corresponds to the command with the set of parameters on the configuration user interface;
   receiving, via the configuration user interface by the user, another selection of a different command from a different application in the plurality of applications, wherein the another selection includes another set of parameters from the different command;
   generating another code payload that corresponds to the different command with the another set of parameters on the configuration user interface; and generating a customized user interface that includes both the command and the different command by compiling the code payload and the another code payload, wherein the configuration user interface includes a preview interface that depicts a layout of the customized user interface, and is configured to receive, via the configuration user interface by the user, a selection of at least one widget for placement on the preview interface.

10. The method of claim 9, wherein the at least one widget comprises at least one button for the command and the different command.

11. The method of claim 10, further comprising:
receiving, via the configuration user interface, a widget size and a placement location on the preview interface for a first widget of the at least one widget; and
generating the customized user interface to depict the first widget at the widget size in the placement location on the customized user interface.

12. The method of claim 10, wherein receiving the selection of the at least one widget comprising:
executing a drag and drop function that moves the at least one widget from a customization window to the preview interface.

13. The method of claim 9, wherein the set of parameters from the command is a portion of all parameters associated with the command, and wherein the command is a specific command instance.

14. The method of claim 9, further comprising:
receiving, via the configuration user interface, a workload comprising at least one node to execute the command; and
transmitting the code payload to the workload for execution.

15. The method of claim 14, further comprising:
receiving, via the configuration user interface, a different workload comprising at least one different node to execute the different command; and
transmitting the another code payload to the different workload for execution.

16. The method of claim 14, further comprising:
receiving, via the configuration user interface, a different workload comprising at least one different node to execute the command; and
transmitting the code payload to the workload and the different workload for execution.

* * * * *